(12) United States Patent
Hicks et al.

(10) Patent No.: US 10,970,197 B2
(45) Date of Patent: Apr. 6, 2021

(54) BREAKPOINT VALUE-BASED VERSION CONTROL

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Thomas Rawlins, New Paltz, NY (US); Steven Partlow, Beacon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/440,800

(22) Filed: Jun. 13, 2019

(65) Prior Publication Data
US 2020/0394128 A1    Dec. 17, 2020

(51) Int. Cl.
*G06F 9/44*        (2018.01)
*G06F 11/36*       (2006.01)
*G06F 8/71*        (2018.01)

(52) U.S. Cl.
CPC ............ *G06F 11/3688* (2013.01); *G06F 8/71* (2013.01); *G06F 11/3692* (2013.01)

(58) Field of Classification Search
CPC ..... G06F 11/3688; G06F 8/71; G06F 11/3692
USPC ................................................ 717/124–140
See application file for complete search history.

(56) References Cited

U.S. PATENT DOCUMENTS

| 5,153,881 | A |   | 10/1992 | Bruckert |
| 5,185,877 | A |   | 2/1993  | Bissett |
| 5,694,540 | A |   | 12/1997 | Humelsine |
| 5,758,062 | A | * | 5/1998  | McMahon .......... G06F 11/3688 714/33 |
| 6,859,922 | B1 |  | 2/2005  | Baker |

(Continued)

FOREIGN PATENT DOCUMENTS

| WO | 2016138953 A1 | 9/2016 |
| WO | 2018162048 A1 | 9/2018 |

OTHER PUBLICATIONS

Yan et al, "Regression From Uncertain Labels and Its Applications to Soft Biometrics", IEEE, pp. 698-708 (Year: 2008).*

(Continued)

*Primary Examiner* — Anil Khatri
(74) *Attorney, Agent, or Firm* — Cantor Colburn LLP; Teddi Maranzano

(57) ABSTRACT

Systems, methods, and computer-readable media are described for performing revision control for a System Under Test (SUT) such as a body of source code. Prior to committing code changes, a collection of breakpoints associated with the portion(s) of source code being changed are determined. Stored fingerprints corresponding to regression test cases are evaluated to identify a set of stored fingerprints that are cumulatively indicative of the collection of breakpoints. Attributes respectively stored in association with the set of stored fingerprints are determined and a corresponding group of regression test cases are determined. The code changes are committed responsive to successful execution of the selected group of regression test cases.

17 Claims, 5 Drawing Sheets

(56) References Cited

U.S. PATENT DOCUMENTS

| | | | | |
|---|---|---|---|---|
| 7,093,238 B2* | 8/2006 | Givoni | | G06F 11/3664 714/E11.208 |
| 7,178,063 B1 | 2/2007 | Smith | | |
| 7,315,634 B2* | 1/2008 | Martin | | G06K 9/00093 382/124 |
| 7,363,495 B2* | 4/2008 | Felt | | G06Q 20/3829 713/170 |
| 7,386,839 B1* | 6/2008 | Golender | | G06F 11/366 717/131 |
| 7,552,425 B2 | 6/2009 | Bates et al. | | |
| 7,596,778 B2 | 9/2009 | Kolawa | | |
| 7,617,074 B2 | 11/2009 | Beish | | |
| 7,640,470 B2 | 12/2009 | Lammel | | |
| 7,640,740 B2 | 1/2010 | Lammel | | |
| 7,721,265 B1* | 5/2010 | Xu | | G06F 9/45512 717/127 |
| 7,861,226 B1* | 12/2010 | Episkopos | | G06F 11/3696 717/124 |
| 7,945,898 B1 | 5/2011 | Episkopos et al. | | |
| 7,958,400 B2 | 6/2011 | Ur | | |
| 7,962,798 B2 | 6/2011 | Locasto | | |
| 8,225,194 B2* | 7/2012 | Rechsteiner | | H04N 21/47214 715/206 |
| 8,296,445 B1* | 10/2012 | Hackborn | | G06F 11/3664 709/228 |
| 8,296,605 B2 | 10/2012 | John | | |
| 8,301,757 B2 | 10/2012 | Catlin | | |
| 8,370,816 B2 | 2/2013 | Farchi et al. | | |
| 8,479,171 B2 | 7/2013 | Ghosh | | |
| 8,527,813 B2 | 9/2013 | Budnik | | |
| 8,554,811 B2 | 10/2013 | Mariani | | |
| 8,639,625 B1* | 1/2014 | Ginter | | G06F 21/51 705/51 |
| 8,649,995 B2 | 2/2014 | Thulasidasan et al. | | |
| 8,756,460 B2 | 6/2014 | Blue et al. | | |
| 8,775,886 B2 | 7/2014 | Mellen | | |
| 8,806,450 B1 | 8/2014 | Maharana | | |
| 8,856,129 B2* | 10/2014 | Cai | | G06F 16/355 707/738 |
| 8,949,674 B2 | 2/2015 | Mancoridis | | |
| 8,954,926 B2 | 2/2015 | Braun et al. | | |
| 8,954,930 B2 | 2/2015 | Kamenz | | |
| 8,997,061 B1 | 3/2015 | Davison | | |
| 9,063,899 B2 | 6/2015 | Epstein | | |
| 9,098,635 B2 | 8/2015 | Peri-Glass et al. | | |
| 9,111,033 B2 | 8/2015 | Bates | | |
| 9,202,005 B2 | 12/2015 | Goswami et al. | | |
| 9,286,313 B1 | 3/2016 | Sharangpani | | |
| 9,336,122 B2 | 5/2016 | Kilzer et al. | | |
| 9,454,466 B2 | 9/2016 | Ivrii et al. | | |
| 9,489,289 B2 | 11/2016 | Hu | | |
| 9,513,998 B2 | 12/2016 | Coronado | | |
| 9,529,701 B2 | 12/2016 | Ekambaram et al. | | |
| 9,600,401 B1* | 3/2017 | Haischt | | G06F 11/3664 |
| 9,600,403 B1 | 3/2017 | Raz | | |
| 9,626,277 B2* | 4/2017 | Thangamani | | G06F 11/34 |
| 9,720,766 B2 | 8/2017 | Lee | | |
| 9,734,263 B2 | 8/2017 | Kohavi et al. | | |
| 9,779,013 B2 | 10/2017 | Narayan et al. | | |
| 9,857,959 B2 | 1/2018 | Dhawal | | |
| 9,864,675 B2* | 1/2018 | Ug | | G06F 11/3688 |
| 9,916,414 B2 | 3/2018 | Jeong | | |
| 10,073,763 B1 | 3/2018 | Raman | | |
| 9,990,272 B2 | 6/2018 | Cooper | | |
| 9,996,452 B2 | 6/2018 | Cooper et al. | | |
| 10,061,685 B1 | 8/2018 | White | | |
| 10,152,479 B1 | 12/2018 | Granstrom | | |
| 10,270,748 B2* | 4/2019 | Briceno | | H04L 63/08 |
| 10,383,553 B1* | 8/2019 | Glenn | | G16H 10/20 |
| 10,430,318 B1 | 10/2019 | Ansari | | |
| 10,637,853 B2* | 4/2020 | Lindemann | | H04L 63/126 |
| 10,776,464 B2* | 9/2020 | Wilson | | G07F 19/20 |
| 2003/0233600 A1 | 12/2003 | Hartman | | |
| 2004/0154001 A1 | 8/2004 | Haghighat et al. | | |
| 2006/0179386 A1 | 8/2006 | Pushpavanam | | |
| 2008/0065931 A1 | 3/2008 | Coulter | | |
| 2008/0163165 A1 | 7/2008 | Shitrit | | |
| 2008/0172652 A1 | 7/2008 | Davia et al. | | |
| 2009/0249123 A1 | 10/2009 | Chow | | |
| 2010/0023928 A1 | 1/2010 | Hentschel et al. | | |
| 2010/0100871 A1 | 4/2010 | Celeskey | | |
| 2010/0287534 A1 | 11/2010 | Vangala et al. | | |
| 2011/0016457 A1 | 1/2011 | Artzi et al. | | |
| 2011/0145653 A1 | 6/2011 | Broadfoot | | |
| 2012/0191443 A1 | 7/2012 | Amalfitano | | |
| 2012/0253728 A1 | 10/2012 | Chamas | | |
| 2012/0260132 A1 | 10/2012 | Blue | | |
| 2013/0152047 A1 | 6/2013 | Moorthi | | |
| 2014/0013307 A1 | 1/2014 | Hansson | | |
| 2014/0059081 A1 | 2/2014 | Farchi et al. | | |
| 2014/0095933 A1 | 4/2014 | Griesinger | | |
| 2014/0372083 A1 | 12/2014 | Hsu et al. | | |
| 2015/0094997 A1 | 4/2015 | Ivrii et al. | | |
| 2015/0106653 A1 | 4/2015 | Adler et al. | | |
| 2016/0140027 A1* | 5/2016 | Ug | | G06F 11/3692 717/129 |
| 2016/0378618 A1 | 12/2016 | Cmielowski et al. | | |
| 2017/0060734 A1 | 3/2017 | Raz et al. | | |
| 2017/0103013 A1 | 4/2017 | Grechanik | | |
| 2017/0132119 A1 | 5/2017 | Xu et al. | | |
| 2017/0199810 A1 | 7/2017 | Hamilton | | |
| 2017/0262361 A1 | 9/2017 | Francis | | |
| 2017/0270035 A1 | 9/2017 | Nie | | |
| 2018/0024911 A1 | 1/2018 | Kruszewski et al. | | |
| 2018/0052725 A1 | 2/2018 | Hannson | | |
| 2018/0095867 A1 | 4/2018 | Varadarajan et al. | | |
| 2018/0293156 A1 | 10/2018 | Zeng | | |
| 2018/0300226 A1 | 10/2018 | Manolios | | |
| 2018/0329807 A1 | 11/2018 | Atyam | | |
| 2019/0332523 A1 | 10/2019 | Gefen | | |
| 2020/0242011 A1 | 7/2020 | Hicks | | |
| 2020/0242012 A1 | 7/2020 | Hicks | | |
| 2020/0242013 A1 | 7/2020 | Hicks | | |

OTHER PUBLICATIONS

Trokielewicz, "Linear Regression Analysis of Template Aging in Iris Biometrics", IEEE, pp. 1-6 (Year: 2015).*

Bromme et al, "Conceptual Framework for Testing Biometric Algorithms within Operating Systems' Authentication", ACM, pp. 273-280 (Year: 2002).*

Snelick et al, "Multimodal Biometrics: Issues in Design and Testing", ACM, pp. 68-72 (Year: 2003).*

Shu et al, "Testing Security Properties of Protocol Implementations—a Machine Learning Based Approach", IEEE, pp. 1-8 (Year: 2007).*

Jain et al, "Fingerprint Matching", IEEE, pp. 36-40 (Year: 2010).*

Ratha et al, "A Real-Time Matching System for Large Fingerprint Databases", IEEE, pp. 799-813 (Year: 1996).*

Esmaeili et al, "A Robust and Fast Video Copy Detection System Using Content-Based Fingerprinting", IEEE, pp. 213-226 (Year: 2011).*

Anonymous, "A Method and System for Providing Collaborative Platform as a Service for Aiding Machine Learning Development," IP.com (IPCOM000256095D). Nov. 2, 2018. 5 pages.

Anonymous, "Black Hole Testing—Machine Learning Program Behavior Patterns from Massive Automated Test Results," IP.com (IPCOM000243987D). Nov. 4, 2015. 8 pages.

Anonymously Disclosed "A system and method for setting breakpoints automatically by comparing correct and incorrect runs" IP.com No. IPCOM000252399D, Publication Date: Jan. 8, 2018, 5 pages.

Anonymously Disclosed "Advanced Interrogative Debugger for data-centric domain", IP.com No. IPCOM000226865D, Publication Date: Apr. 23, 2013, 14 pages.

Anonymously Disclosed "Cognitive, Self-Instrumenting Code on Detection of an Issue" IP.com No. IPCOM000253277D; Publication Date: Mar. 19, 2018; 4 pgs.

(56) References Cited

OTHER PUBLICATIONS

Anonymously Disclosed "Method and system to find potential program defect based on run-time variable change analysis", IP.com No. IPCOM000248699D, Publication Date: Dec. 28, 2016, 8 pages.
Anonymously Disclosed "Method for a debugging tool for finding variable value in application stack", IP.com No. IPCOM000209789D, Publication Date: Aug. 15, 2011, 5 pages.
Anonymously Disclosed "Method to enable debugger breakpoint inside statement", IP.com No. IPCOM000206941D, Publication Date: May 13, 2011, 8 pages.
Anonymously Disclosed "Simple Automated Code Coverage Method for test metrics", IP.com No. IPCOM000201864D, Publication Date: Nov. 29, 2010, 6 pages.
Anonymously Disclosed "Structured enhanced breakpoint chain", IP.com No. IPCOM000244264D, Publication Date: Nov. 27, 2015, 4 pages.
Anonymously Disclosed "System and method for improved regression failure analysis and easier debugging of test failures", IP.com No. IPCOM000209599D, Publication Date: Aug. 10, 2011, 6 pages.
Astigarraga, Tara "IBM Test Overview and Best Practices", IBM, Nov. 2012, pp. 1-53.
Cohen, D. M. et al., "The AETG system: An approach to testing based on combinatorial design." IEEE Transactions on Software Engineering, 23(7), pp. 437-444. Jul. 1997.
Compuware Corporation "Validate Testing Thoroughness and Provide Application Analysis", 2014, 4 pages.
De Souza et al., "Spectrum-based Software Fault Localization: A Survey of Techniques, Advances and Challenges" Dept. of Computer Science—University of Sao Paulo; arXiv:1607.04347v2 [cs.SE]; Nov. 26, 2017, 46 pages.
Devai, Gergely et al., "UML Model Execution via Code Generation" Eotvos Lorand University, Faculty of Informatics, Budapest, Hungary 2017, pp. 9-15.
Hicks et al., "Champion Test Case Generation", U.S. Appl. No. 16/256,949, filed Jan. 24, 2019.
Hicks et al., "Combinatoric Set Completion Through Unique Test Case Generation", U.S. Appl. No. 16/256,394, filed Jan. 24, 2019.
Hicks et al., "Fault Detection and Localization Using Combinatorial Test Design Techniques While Adhering to Archtiectural", U.S. Appl. No. 16/256,391, filed Jan. 24, 2019.
Hicks et al., "Reduction of Test Infrastructure", U.S. Appl. No. 16/440,781, filed Jun. 13, 2019.
Hicks et al., "Self Healing Software Utilizing Regression Test Fingerprints", U.S. Appl. No. 16/440,833, filed Jun. 13, 2019.
Hicks et al., "Test Space Analysis Across Multiple Combinatoric Models", U.S. Appl. No. 16/256,388, filed Jan. 24, 2019.
Hicks et al., "Associating Attribute Seeds of Regression Test Cases With Breakpoint Value-Based Fingerprints," U.S. Appl. No. 16/440,857, filed Jun. 13, 2019.
Hicks et al., "Fault Detection and Localization to Generate Failing Test Cases Using Combinatorial Test Design Techniques", U.S. Appl. No. 16/256,388, filed Jan. 24, 2019.
Hicks et al., "Customizable Test Set Selection Using Code Flow Trees," U.S. Appl. No. 16/440,751, filed Jun. 13, 2019.
Hicks et al., "Fault Detection Using Breakpoint Value-Based Fingerprints of Failing Regression Test Cases," U.S. Appl. No. 16/440,810, filed Jun. 13, 2019.
Hicks et al., "Regression Test Fingerprints Based on Breakpoint Values," U.S. Appl. No. 16/440,404, filed Jun. 13, 2019.
IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.
IBM, "InspectioN Testing Using Debugging Capabilities to Allow Combinational Testing", IP.com No. IPCOM000188370D, Electronic Publication Date: Oct. 2, 2009, 3 pages.
IBM, "Tool and Strategy for testing and validating software components at the source code level", IP.com No. IPCOM000180330D, Publication Date: Mar. 6, 2009, 3 pages.
IBM, Method of preventing build failures by searching through levels in a multi-level revision control system IP.com No. IPCOM000179779D, Publication Date: Feb. 25, 2009, 3 pages.
Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tübingen, DE, 2017, 6 pages.
Kuhn, Rick "Introduction to Combinatorial Testing", NIST, Carnegie-Mellon University, Jun. 7, 2011, 48 pages.
Leon et al., "An empirical evaluation of test case filtering techniques based on exercising complex information flows," Proceedings of the 27th International Conference on Software Engineering, pp. 412-421. ACM, 2005.
Kamalakar, Sunil, "Automatically Generating Tests from Natural Language Descriptions of Software Behavior," Virginia Polytechic Institute and State University, Sep. 23, 2013. 72 pages.
List of IBM Patents or Patent Applications Treated As Related; Date Filed: Jul. 19, 2019, 2 pages.
Mathur et al., "Adaptive Automation: Leveraging Machine Learning to Support Uninterrupted Automated Testing of Software Applications" arXiv.org, Aug. 4, 2015. 6 pages.
Nguyen et al., "Combining model-based and combinatorial testing for effective test case generation," Proceedings of the 2012 International Symposium on Software Testing and Analysis, Jul. 15-20, 2012. pp. 100-110.
Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.
Segall "Combinatorial Test Design" IBM Haifa Research Labs, 2012, pp. 1-49.
Shakya, K. & Xie, T., "Isolating Failure-Inducing Combinations in Combinatorial Testing using Test Augmentation and Classification", CT 2012 workshop, (23 pages).
Soffa, Mary Lou et al. Exploiting Hardware Advances for Software Testing and Debugging (NIER Track) ICSE '11; May 21-28, 2011; 4 pgs.
Yilmaz et al., "Moving forward with combinatorial interaction testing," Computer, 47(2). Feb. 2014. pp. 37-45.
Willmor, David, and Suzanne M. Embury. "A safe regression test selection technique for database-driven applications." 21st IEEE International Conference on Software Maintenance (ICSM'05). IEEE, 2005.pp. 1-10 (Year: 2005).
"All pair testing" wikipedia page from dated Sep. 14, 2017, retrieved using the WayBackMachine, from https://web.archive.org/web/20170914145543/https://en.wikipedia.org/wiki/All-pairs_testing (Year: 2017).
"CPC Cooperative Patent Classification, G06F Electrical Digital Dat Processing" of Apr. 2015, retrieved from https://www.cooperativepatentclassification.org/cpc/ (Year: 2015).
Orso, Alessandro, Nanjuan Shi, and Mary Jean Harrold. "Scaling regression testing to large software systems." ACM SIGSOFT Software Engineering Notes 29.6 (2004): pp. 241-251. (Year: 2004).
Rothermel et al., "Analyzing Regression Test Selection Techniques", IEEE, pp. 529-551 (Year: 1996).
Wikipedia "Cartesian Product" web page, from date Jan. 15, 2019, retrieved from https://web.archive.org/web/20190115231627/https://en.wikipedia.org/wiki/Cartesian_product (Year: 2019).
Yi, Qiuping, et al. "A synergistic analysis method for explaining failed regression tests." 2015 IEEE/ACM 37th IEEE International Conference on Software Engineering. vol. 1. IEEE, 2015.pp. 257-267 (Year: 2015).
Yimaz et al., "Moving forward with combinatorial interaction testing", Feb. 2014, 47(2), pp. 37-45.

\* cited by examiner

BREAKPOINT VALUE-BASED VERSION CONTROL

RELATED APPLICATIONS

This application which claims the benefits of multiple legally related applications including Application titled "FAULT DETECTION AND LOCALIZATION TO GENERATE FAILING TEST CASES USING COMBINATORIAL TEST DESIGN TECHNIQUES" assigned Ser. No. 16/256,388, filed Jan. 24, 2019; Application titled "FAULT DETECTION AND LOCALIZATION USING COMBINATORIAL TEST DESIGN TECHNIQUES WHILE ADHERING TO ARCHITECTURAL RESTRICTIONS" assigned Ser. No. 16/256,391, filed Jan. 24, 2019; Application titled "COMBINATORIC SET COMPLETION THROUGH UNIQUE TEST CASE GENERATION" assigned Ser. No. 16/256,394, filed Jan. 24, 2019; Application titled "TEST SPACE ANALYSIS ACROSS MULTIPLE COMBINATORIC MODELS" assigned Ser. No. 16/256,179, filed Jan. 24, 2019; Application titled "CHAMPION TESTCASE GENERATION" assigned Ser. No. 16/256,949, filed Jan. 24, 2019; Application titled "REGRESSION TEST FINGERPRINTS BASED ON BREAKPOINT VALUES," assigned Ser. No. 16/440,404, filed Jun. 13, 2019; Application titled "SELF HEALING SOFTWARE UTILIZING REGRESSION TEST FINGERPRINTS," Ser. No. 16/440,833, Jun. 13, 2019; Application titled "REDUCTION OF TEST INFRASTRUCTURE," Ser. No. 16/440,781, Jun. 13, 2019; Application titled "CUSTOMIZABLE TEST SET SELECTION USING CODE FLOW TREES," Ser. No. 16/440,751, Jun. 13, 2019; Application titled "FAULT DETECTION USING BREAKPOINT VALUE-BASED FINGERPRINTS OF FAILING REGRESSION TEST CASES," Ser. No. 16/440,810, Jun. 13, 2019; and Application titled "ASSOCIATING ATTRIBUTE SEEDS OF REGRESSION TEST CASES WITH BREAKPOINT VALUE-BASED FINGERPRINTS," Ser. No. 16/440,857, Jun. 13, 2019, with all the benefits accruing therefrom, the contents of which in its entirety are herein incorporated by reference.

BACKGROUND

The present invention relates generally to revision control for changes to a System Under Test (SUT) such as a body of source code, and more particularly, to performing automated regression testing by mapping regression tests to the changes via breakpoint values.

Breakpoints are intentional stopping or pausing points in a program, typically inserted for the purposes of debugging. More generally, a breakpoint is a means of acquiring knowledge about a program's execution. When a breakpoint is reached during execution, a test environment (e.g., general purpose registers, memory, logs, files, etc.) can be inspected to attempt to determine whether the program is functioning as expected. Breakpoints are commonly used to interrupt a running program immediately before execution of particular program instructions, in which case, they may be referred to as instruction breakpoints.

Combinatorial Test Design (CTD) is a testing methodology that seeks to increase test space coverage for a SUT through the use of automated algorithms. These algorithms identify input patterns that are most likely to locate problems in the SUT, thereby reducing the amount of time required for a tester to build test cases and an automation framework. CTD is well-adapted for projects that require numerous variations on static input vectors to properly test various system states and logic pathways, which would otherwise be extremely cumbersome for a human tester.

CTD provides enhanced testing efficiency over manual testing through the use of automated algorithms. CTD methodologies, however, still suffer from a number of technical drawbacks, technical solutions to which are described herein.

SUMMARY

In one or more example embodiments, a method for performing revision control for source code is disclosed. The method includes identifying one or more portions of the source code that have been modified; determining a collection of breakpoints corresponding to the one or more modified portions of the source code; and determining a group of regression test cases that cumulatively provide coverage of the collection of breakpoints. The method further includes executing the group of regression test cases. Then, responsive to determining that the group of regression test cases successfully executed, the one or more modified portions of the source code are committed.

In one or more other example embodiments, a system for performing revision control for source code is disclosed. The system includes at least one memory storing computer-executable instructions and at least one processor configured to access the at least one memory and execute the computer-executable instructions to perform a set of operations. The operations include identifying one or more portions of the source code that have been modified; determining a collection of breakpoints corresponding to the one or more modified portions of the source code; and determining a group of regression test cases that cumulatively provide coverage of the collection of breakpoints. The operations further include executing the group of regression test cases. Then, responsive to determining that the group of regression test cases successfully executed, the one or more modified portions of the source code are committed.

In one or more other example embodiments, a computer program product for performing revision control for source code is disclosed. The computer program product includes a computer readable storage medium having program instructions embodied therewith. The program instructions are executable by a processing circuit to cause the processing circuit to perform a method. The method includes identifying one or more portions of the source code that have been modified; determining a collection of breakpoints corresponding to the one or more modified portions of the source code; and determining a group of regression test cases that cumulatively provide coverage of the collection of breakpoints. The method further includes executing the group of regression test cases. Then, responsive to determining that the group of regression test cases successfully executed, the one or more modified portions of the source code are committed.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
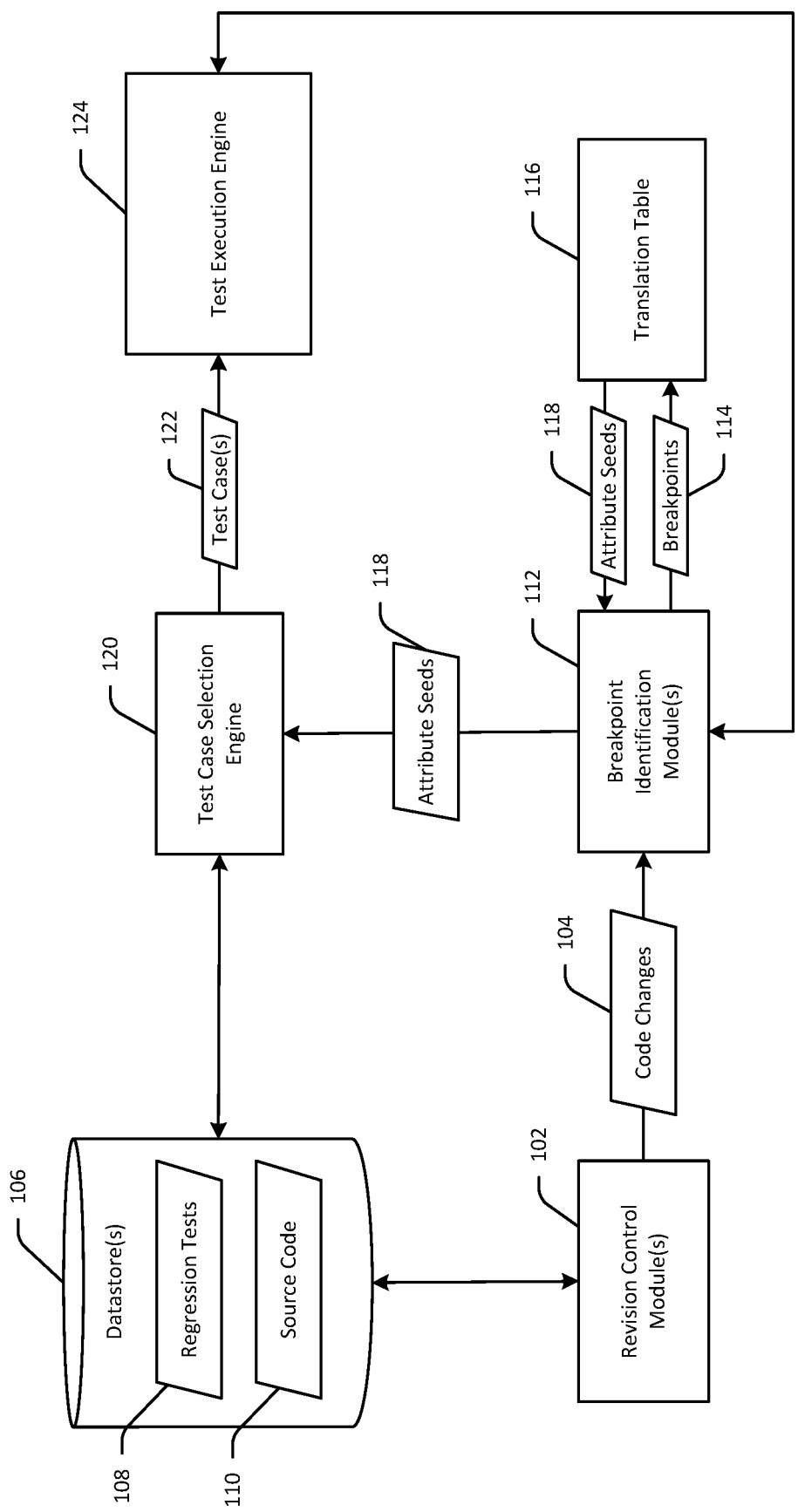
FIG. 1 is a schematic hybrid data flow/block diagram illustrating revision control performed on a body of source code in accordance with one or more example embodiments of the invention.

Example embodiments of the invention relate to, among other things, devices, systems, methods, computer-readable media, techniques, and methodologies for performing revision control for a System Under Test (SUT) such as a body of source code. Revision control in accordance with example embodiments of the invention includes identifying one or more portions of a body of source code that have been modified. Modifications may include any change to the underlying source code including, without limitation, modification, addition, and/or deletion of functions or routines; modification, addition, and/or deletion of function parameters; modification, addition, and/or deletion of variables; and so forth.

A collection of breakpoints corresponding to the modified portion(s) of the source code can then be determined. Breakpoints are points in the execution of source code that occur before or after one or more lines of source code and that can halt execution of the program or trigger specific tools. In example embodiments, a breakpoint may be associated with each line of code in a body of source code. In other example embodiments, a breakpoint may correspond to multiple lines of code.

Once the collection of breakpoints are identified, a set of stored fingerprints that are cumulatively indicative of the collection of breakpoints may be determined. In example embodiments, each regression test case may be stored in association with a corresponding fingerprint that is indicative of breakpoints encountered along a code path traversed during execution of the test case. As used herein, a code path may refer to a path traversed during execution of a regression test case and may indicate a number of times each breakpoint is encountered during execution of the test case, and potentially, an order in which such breakpoints are encountered during execution.

A translation table or other suitable organized data storage may be populated with entries that associate regression tests with their corresponding test fingerprints. In example embodiments, a translation table entry may include an attribute seed of a test case stored in association with a test fingerprint corresponding to the test case. The attribute seed may be a representation of the combination of attribute values tested by the test case. In particular, inputs to a SUT such as a body of source code can be modeled as a collection of attributes, each of which is capable of taking on a respective one or more candidate attribute values. CTD techniques may be employed to generate CTD test vectors, where each CTD test vector is representative of a particular combination of attribute values. A corresponding test case may be generated for each such CTD vector that tests the particular combination of attribute values embodied by the CTD vector.

In example embodiments, a test fingerprint is indicative of each breakpoint encountered as part of traversal of a code path during execution of a test case. The test fingerprint may be further indicative of a number of times each such breakpoint is encountered as well as, potentially, an order in which the breakpoint encounters occur. Various algorithms may be employed to generate a test fingerprint for a test case based on breakpoints encountered during execution of the test case. Such algorithms are described in co-pending application entitled "Regression Test Fingerprints Based on Breakpoint Values."

Regardless of the particular algorithm employed to generate a test fingerprint, the fingerprint may be reversible to ascertain which breakpoints were encountered during execution of the test case to which the fingerprint corresponds and a respective number of times each such breakpoint was encountered. Further, in example embodiments, certain fingerprint generation algorithms may generate a test fingerprint that is reversible to further determine an order in which the breakpoint encounters occurred. More specifically, in example embodiments, a test fingerprint may be a data structure that is indexed with respect to the breakpoints present in a SUT. For instance, each element of a test fingerprint may correspond to a particular breakpoint. In example embodiments, a value greater than zero at a particular indexed location in the test fingerprint may indicate that the breakpoint that corresponds to that indexed location was encountered during execution of the corresponding test case. Further, in example embodiments, any given value in a test fingerprint may be broken down into constituent breakpoint values that may be indicative of a number of times a corresponding breakpoint was encountered, and potentially, an order in which the breakpoint was encountered.

In example embodiments, the set of stored fingerprints that are cumulatively indicative of the collection of breakpoints corresponding to the modified portion(s) of the source code may be determined by accessing the translation table to evaluate which breakpoints are embodied in each stored fingerprint. More specifically, in example embodiments, the fingerprint may be broken down into its constituent breakpoint values, which may be assessed to determine which breakpoints were encountered during execution of the test case to which the fingerprint corresponds.

In example embodiments, the constituent breakpoint values of each stored fingerprint may be compared to the collection of breakpoints corresponding to the modified portion(s) of the source code. In example embodiments, a non-zero value at an indexed location in a stored fingerprint that corresponds to a particular breakpoint indicates that the particular breakpoint is represented in that stored fingerprint and that the particular breakpoint was encountered during execution of a regression test case corresponding to that stored fingerprint. In other example embodiments, such as those in which the fingerprint is a string of identifiers indicative of breakpoints encountered during execution of a corresponding test case, presence of an identifier (e.g., a character) corresponding to a particular breakpoint indicates an encounter with that breakpoint.

In certain example embodiments, if the constituent breakpoint values of a stored fingerprint include at least one breakpoint value corresponding to a breakpoint in the collection of breakpoints corresponding to the modified portion(s) of the source code, then the regression test corresponding to that stored fingerprint may be selected for execution prior to committing the modification(s) to the source code. In such example embodiments, the group of regression test cases selected for execution may provide complete coverage of the collection of breakpoints with some potential for a particular regression test to be completely redundant in terms of the breakpoints encountered with respect to another regression test. That is, a regression test may be selected for execution even though every breakpoint encountered by that regression test is cumulatively encountered by one or more other regression tests selected for execution as long as the group of regression tests taken as a whole encounter all breakpoints in the collection of breakpoints.

For example, assuming that the collection of breakpoints corresponding to modified portion(s) of source code includes breakpoints A, B, C, and D, then the group of regression test cases selected for execution may include a first regression test that encounters breakpoints A, B, C, and D during execution; a second regression test that encounters breakpoints A, B, and C during execution; and a third regression test that encounters breakpoints C and D during execution. Although the first regression test alone provides complete coverage of the collection of breakpoints, additional regression tests that also encounter breakpoint(s) in the collection of breakpoints are also selected for execution.

In other example embodiments, a regression test may be selected for execution only if its corresponding stored fingerprint includes a constituent breakpoint value that corresponds to a breakpoint in the collection of breakpoints corresponding to the modified portion(s) of the source code that is not represented in any other stored fingerprint corresponding to a regression test. For example, if the collection of breakpoints corresponding to modified portion(s) of source code includes breakpoints A, B, C, and D, then the group of regression test cases selected for execution may include a first regression test that encounters breakpoints A and B during execution; a second regression test that encounters breakpoint B and C during execution; and a third regression test that encounters breakpoint D during execution. While there is some potential for overlap in breakpoints encountered between regression test cases selected for execution, any regression test selected for execution in accordance with the presently described example embodiments encounters at least one unique breakpoint not encountered by any other regression test selected for execution.

In example embodiments, the group of regression test cases that provides cumulative coverage of the collection of breakpoints corresponding to modified portion(s) of source code is executed. In example embodiments, the modification(s) to the source code may be committed by the revision control protocol responsive to successful execution of the group of regression test cases. Failure of one or more of the regression tests to successfully execute may indicate the presence of faults in the modified source code that can be further investigated.

In example embodiments, the revision control protocol may prioritize certain regression tests selected for execution over other regression tests selected for execution. For instance, a regression test that encounters a greater number of breakpoints in the collection of breakpoints corresponding to modified portion(s) of source code may be prioritized for execution over another regression test that encounters a fewer number of breakpoints. In example embodiments, the group of regression tests selected for execution may be executed in the descending order of the number of breakpoints encountered during execution of the regression tests. For instance, if the collection of breakpoints corresponding to modified portion(s) of source code includes breakpoints A, B, C, and D, then a first regression test that encounters all four breakpoints may be executed first, followed by a second regression test that encounters breakpoints B, C, and D, and further followed by a third regression test that encounters breakpoints C and D.

In example embodiments, the regression test cases may be executed with respect to a SUT. While example embodiments may be described herein with respect to SUTs that are software systems such as a body of source code, it should be appreciated that the SUT may be a hardware system or a collection of hardware logic as well. Further, certain terminology used herein to describe a collection of elements, a type of data structure, or the like are not intended to be limiting in any way and are intended to encompass any variation or alternative that achieves the same function. For instance, reference made herein to a test vector or some variation thereof is not intended to limit embodiments of the invention to any particular type of data structure for representing a test vector. The combination of attribute-value pairs represented by a test vector can be stored/represented using any suitable type of data structure. As another example, the terms set, group, collection, and the like are used interchangeably herein to connote any collection of elements that may or may not be ordered. In addition, while example embodiments may be described herein in connection with a translation table for storing associations between attribute seeds of test cases and corresponding test fingerprints, it should be appreciated that the translation table may be a database, repository, or any other organized storage area.

Example embodiments of the invention provide various technical effects over conventional regression testing methodologies. In particular, example embodiments of the invention provide a technical effect of enabling selection of a group of regression test cases that provide complete cumulative coverage of breakpoints associated with modified portion(s) of source code. This technical effect allows for a subset of regression tests that are specifically focused on modified portion(s) of source code to be executed to evaluate the modification(s) prior to committing the code changes without having to execute an entire, potentially much larger, regression bucket of test cases. In a testing environment in which code changes may occur frequently, the above-described technical effect enables regression testing to be performed within time constraints by only executing regression tests that are tailored to modified portion(s) of source code, thereby improving the efficiency of regression testing, and thus, representing an improvement to computer-based regression testing technology. In addition, example embodiments of the invention yield the technical effect of being able to prioritize the execution of selected regression test cases. According to this technical effect, regression tests that provide greater breakpoint coverage may be prioritized for execution. This technical effect is a further improvement to computer-based regression testing technology.

Illustrative methods in accordance with example embodiments of the invention and corresponding data structures (e.g., program modules, engines, etc.) for performing the methods will now be described. It should be noted that each operation of method 300 and/or method 400 respectively depicted in FIGS. 3 and 4 may be performed by one or more of the program modules or the like depicted in FIG. 1 or FIG. 5, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 3:
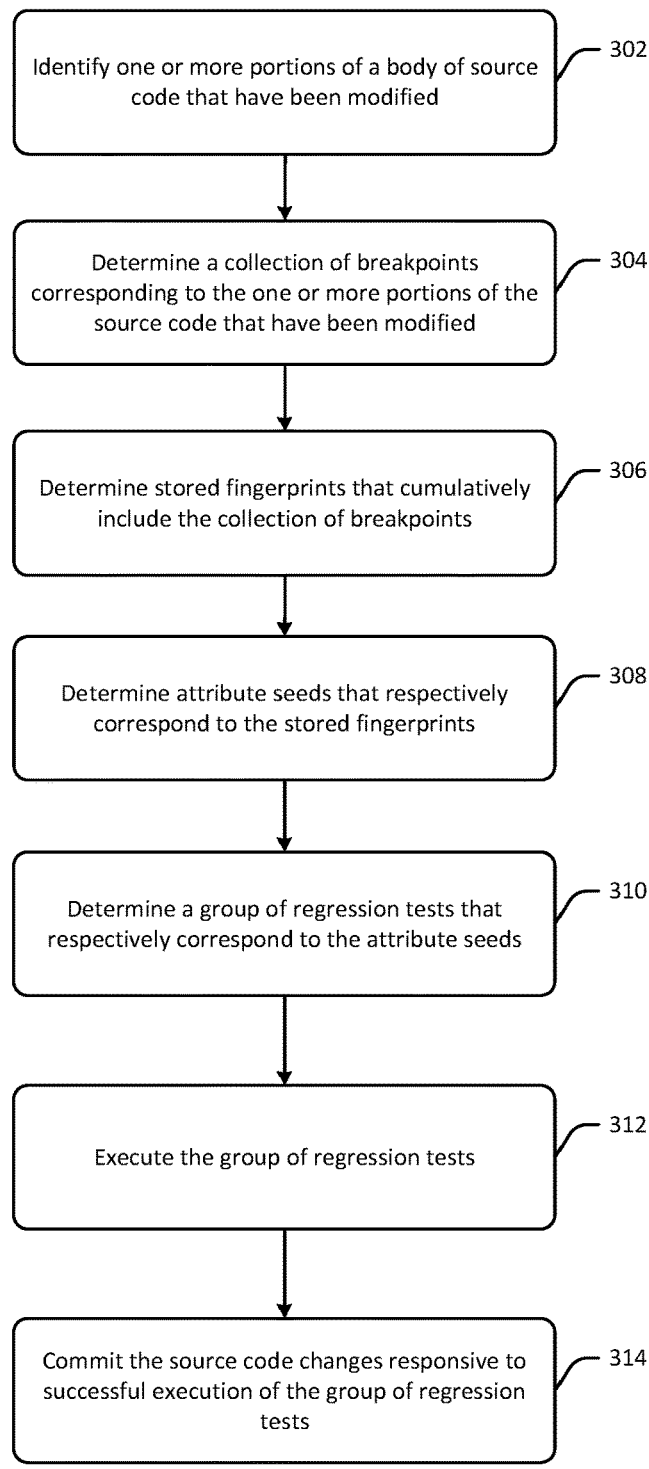
FIG. 3 is a process flow diagram of an illustrative method for performing revision control on a body of source code in accordance with one or more example embodiments of the invention.
Figure 4:
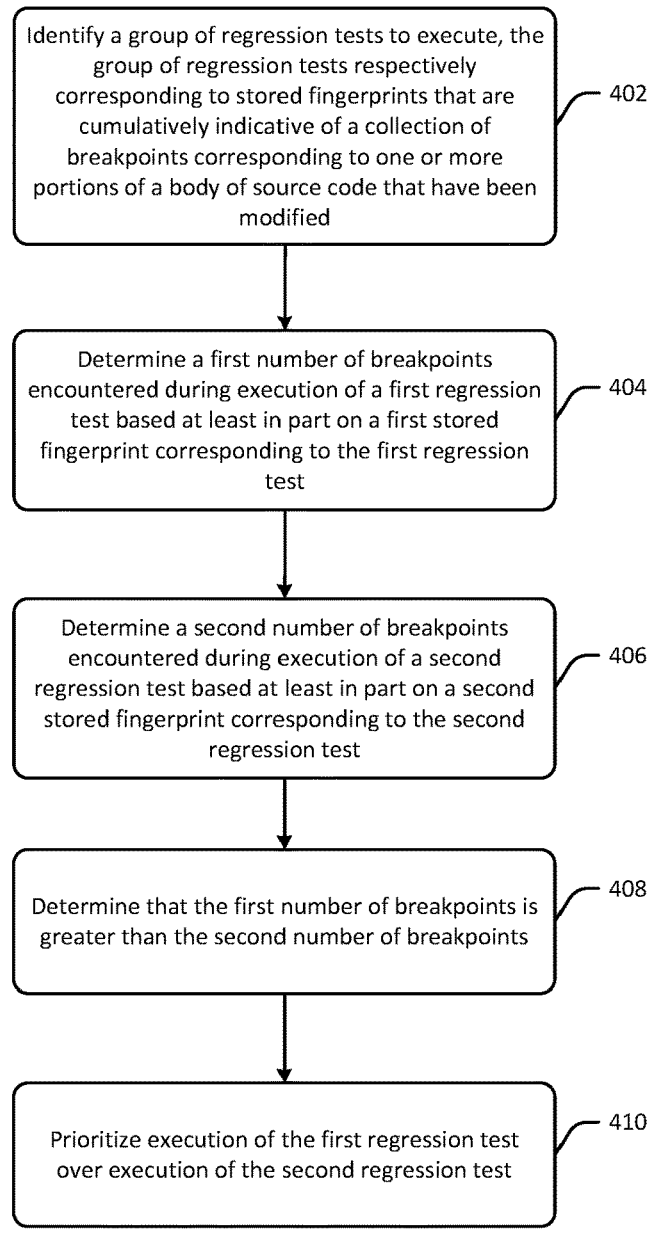
FIG. 4 is a process flow diagram of an illustrative method for prioritizing regression tests for execution based on their breakpoint coverage in accordance with one or more example embodiments of the invention.

FIG. 1 is a schematic hybrid data flow/block diagram illustrating revision control performed on a body of source code in accordance with one or more example embodiments of the invention. FIG. 3 is a process flow diagram of an illustrative method 300 for performing revision control on a body of source code in accordance with one or more example embodiments of the invention. FIG. 4 is a process flow diagram of an illustrative method 400 for prioritizing regression tests for execution based on their breakpoint coverage in accordance with one or more example embodiments of the invention. FIGS. 3 and 4 will each be described in conjunction with FIG. 1 hereinafter.

Referring first to FIG. 3 in conjunction with FIG. 1, at block 302 of the method 300, one or more portions of a body of source code 110 that have been modified may be identified. More specifically, at block 302, computer-executable instructions of one or more revision control modules 102 may be executed to identify code changes 104 (e.g., modification(s) to one or more portions of the source code 110). The source code 110 and data indicative of the code changes 104 may be accessed from one or more datastores 106.

In example embodiments, the datastore(s) 106 may further store a collection of regression tests 108, which have been generated in accordance with CTD methodologies. Each CTD test case 108 may have been generated from a corresponding CTD test vector representative of a particular combination of attribute values to be tested on a SUT such as the source code 110. In certain example embodiments, the set of CTD test cases 108 may provide complete coverage of an entire test space, that is, all possible combinations of attribute values. Generally, however, it is infeasible to execute within any reasonable constraint (e.g., time constraint) the total number of CTD test cases required to provide complete coverage of an entire Cartesian product test space. Thus, in example embodiments, the set of CTD test cases 108 may include reduced set(s) of test cases that provide complete n-wise coverage of a test space but only partial higher-order coverage.

At block 304 of the method 300, computer-executable instructions of one or more breakpoint identification modules 112 may be executed to determine a collection of breakpoints 114 corresponding to the code changes 104. That is, the breakpoint identification module(s) 112 may determine the collection of breakpoints corresponding to the modified portion(s) of the source code 110 as reflected in the code changes 104. As previously noted, in example embodiments, a breakpoint may be associated with each line of code in the source code 110. In other example embodiments, a breakpoint may correspond to multiple lines of code. In example embodiments, the collection of breakpoints 114 may be identified by determining which lines of code are impacted by the code changes 104 and further determining which breakpoints correspond to those lines of code.

At block 306 of the method 300, computer-executable instructions of the breakpoint identification module(s) 112 may be executed to determine stored fingerprints that are cumulatively indicative of the collection of breakpoints 114 corresponding to the code changes 104. In example embodiments, each regression test case 108 may be associated with a corresponding fingerprint that is indicative of breakpoints encountered along a code path traversed during execution of the test case. A translation table 116 or other suitable organized data storage may be populated with entries that associate the regression tests 108 with their corresponding test fingerprints via attribute seeds of the regression tests 108. More specifically, each translation table entry may include an attribute seed of a respective test case stored in association with a test fingerprint corresponding to the test case. The attribute seed may be a representation of the combination of attribute values tested by the test case. In example embodiments, an attribute seed may be a Javascript Object Notation (JSON) mapping of attributes to particular attribute values or any other suitable representation of a particular combination of attribute values.

Figure 2:
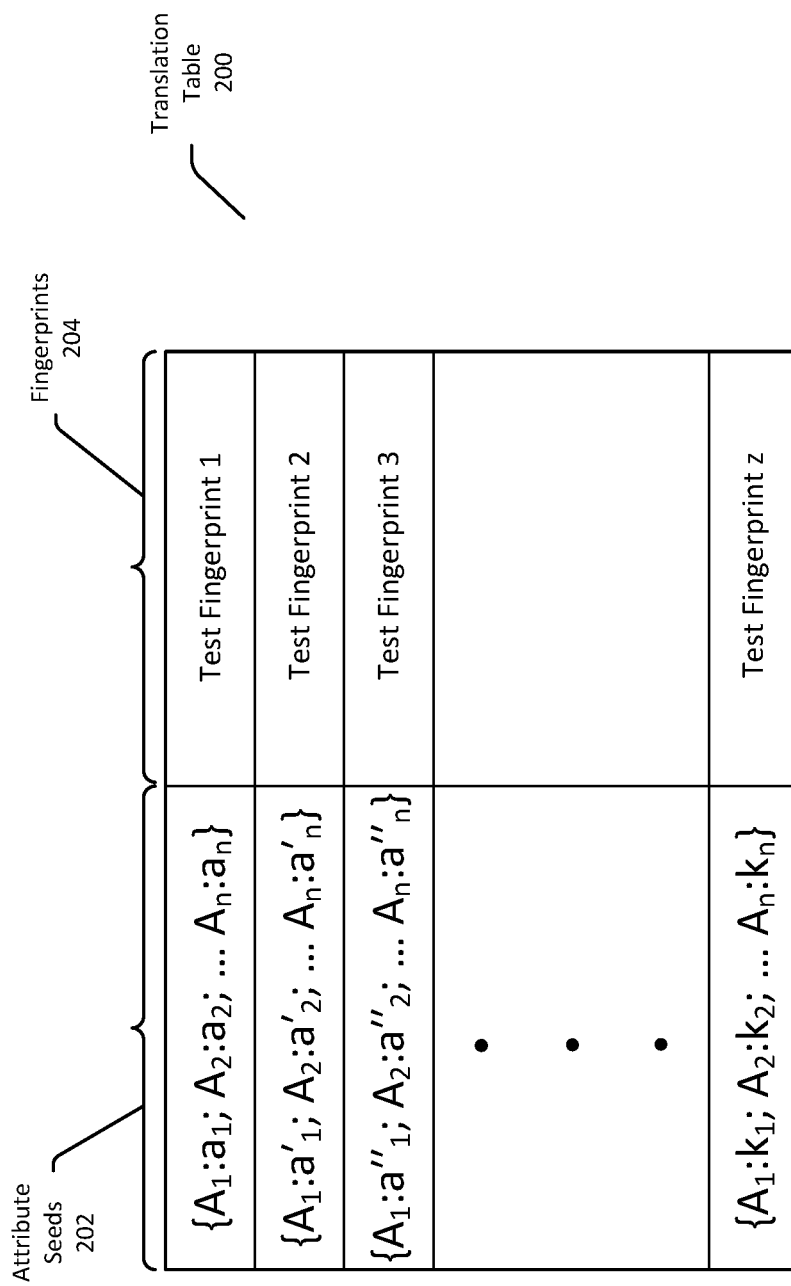
FIG. 2 is a schematic depiction of entries in an example translation table in accordance with one or more example embodiments of the invention.

FIG. 2 is a schematic depiction of entries in an example translation table 200 in accordance with one or more example embodiments of the invention. The example translation table 200 is depicted as including multiple entries that respectively store attribute seeds 202 of test cases in association with corresponding test fingerprints 204 of the test cases. In particular, each translation table entry associates an attribute seed of a particular test case with a corresponding test fingerprint of that test case. As previously noted, each attribute seed represents a particular combination of attribute values tested by a corresponding test case. Each attribute seed is stored in the translation table 200 in association with a test fingerprint that is indicative of at least the breakpoints encountered during execution of the test case corresponding to the attribute seed.

In example embodiments, the breakpoint identification module(s) 112 may determine the set of stored fingerprints that are cumulatively indicative of the collection of breakpoints corresponding to the modified portion(s) of the source code 110 (e.g., the code changes 104) by accessing the translation table 116 to evaluate which breakpoints are embodied in each stored fingerprint in the translation table 116. More specifically, in example embodiments, each stored fingerprint may be broken down into its constituent breakpoint values, which may be assessed to determine which breakpoints were encountered during execution of the test case to which the fingerprint corresponds.

In particular, in example embodiments, the breakpoint identification module(s) 112 may be executed to compare the constituent breakpoint values of each stored fingerprint with the collection of breakpoints 114 corresponding to the code changes 104. In certain example embodiments, if the constituent breakpoint values of a stored fingerprint include at least one breakpoint value corresponding to a breakpoint in the collection of breakpoints corresponding to the code changes 104, then the regression test corresponding to that stored fingerprint may be selected for execution prior to committing the code changes 104. In such example embodiments, a regression test may be selected for execution even though every breakpoint encountered by that regression test is cumulatively encountered by one or more other regression tests selected for execution as long as the group of regression tests taken as a whole encounter all breakpoints in the collection of breakpoints 114. In other example embodiments, a regression test may be selected for execution only if its corresponding stored fingerprint includes a constituent breakpoint value that corresponds to a breakpoint in the collection of breakpoints 114 that is not represented in any other stored fingerprint corresponding to a regression test selected for execution. While there is some potential for overlap in breakpoints encountered between regression test cases selected for execution, any regression test selected for execution in accordance with the presently described example embodiments encounters at least one unique breakpoint not encountered by any other regression test selected for execution.

In example embodiments, at block 308 of the method 300, computer-executable instructions of the breakpoint identification module(s) 112 are executed to determine a set of attribute seeds 118 that respectively correspond to the set of stored fingerprints that are cumulatively indicative of the collection of breakpoints 114, or that in other words, provide complete cumulative coverage of the collection of breakpoints 114. In particular, the corresponding translation table entry for each stored fingerprint determined at block 306 may be accessed at block 308 to identify the attribute seed 118 stored in association therewith. Then, at block 310 of the method 300, computer-executable instructions of a test case selection engine 120 may be executed to determine a group of regression test cases 122 that respectively correspond to the set of attribute seeds 118. In particular, each regression test case 122 may test the same combination of attribute values as a corresponding attribute seed 118.

In example embodiments, at block 312 of the method 300, computer-executable instructions of a test execution engine 124 may be executed to execute the group of regression test cases 122 that provides cumulative coverage of the collection of breakpoints 114 corresponding to the code changes 104. In example embodiments, at block 314 of the method 300, the modification(s) to the source code 110 (e.g., the code changes 104) may be committed to the datastore(s) 106 by the revision control module(s) 102 responsive to successful execution of the group of regression test cases 122. Failure of one or more of the regression tests 122 to successfully execute may indicate the presence of faults in code changes 104 that can be further investigated.

In example embodiments, the revision control protocol may prioritize certain regression tests selected for execution over other regression tests selected for execution. Referring now to FIG. 4, at block 402 of the method 400, a group of regression tests to execute may be identified, where the group of regression tests respectively correspond to stored fingerprints that are cumulatively indicative of a collection of breakpoints corresponding to one or more portions of a body of source code that have been modified. In example embodiments, the group of regression tests identified at block 402 may be the group of regression tests 122 that respectively correspond to stored fingerprints that are cumulatively indicative of the collection of breakpoints 114.

At block 404 of the method 400, computer-executable instructions of the revision control module(s) 102 may be executed to determine a first number of breakpoints encountered during execution of a first regression test case of the regression tests 122 based on a first stored fingerprint corresponding to the first regression test case. Similarly, at block 406 of the method 400, computer-executable instructions of the revision control module(s) 102 may be executed to determine a second number of breakpoints encountered during execution of a second regression test case based on a second stored fingerprint corresponding to the second regression test case.

Then, at block 408 of the method 400, computer-executable instructions of the revision control module(s) 102 may be executed to determine that the first number of breakpoints is greater than the second number of breakpoints, which represents a determination that the first regression test case has greater coverage of the modified portion(s) of the source code than the second regression test case. Finally, at block 410 of the method 400, the revision control module(s) 102 may prioritize execution of the first regression test case over execution of the second regression test case.

In certain example embodiments, the group of regression tests 122 selected for execution may be executed in the descending order of the number of breakpoints encountered during execution of the regression tests. For instance, if the collection of breakpoints corresponding to the code changes 104 includes breakpoints A, B, C, and D, then a first regression test that encounters all four breakpoints may be executed first, followed by a second regression test that encounters breakpoints B, C, and D, and further followed by a third regression test that encounters breakpoints C and D.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 5:
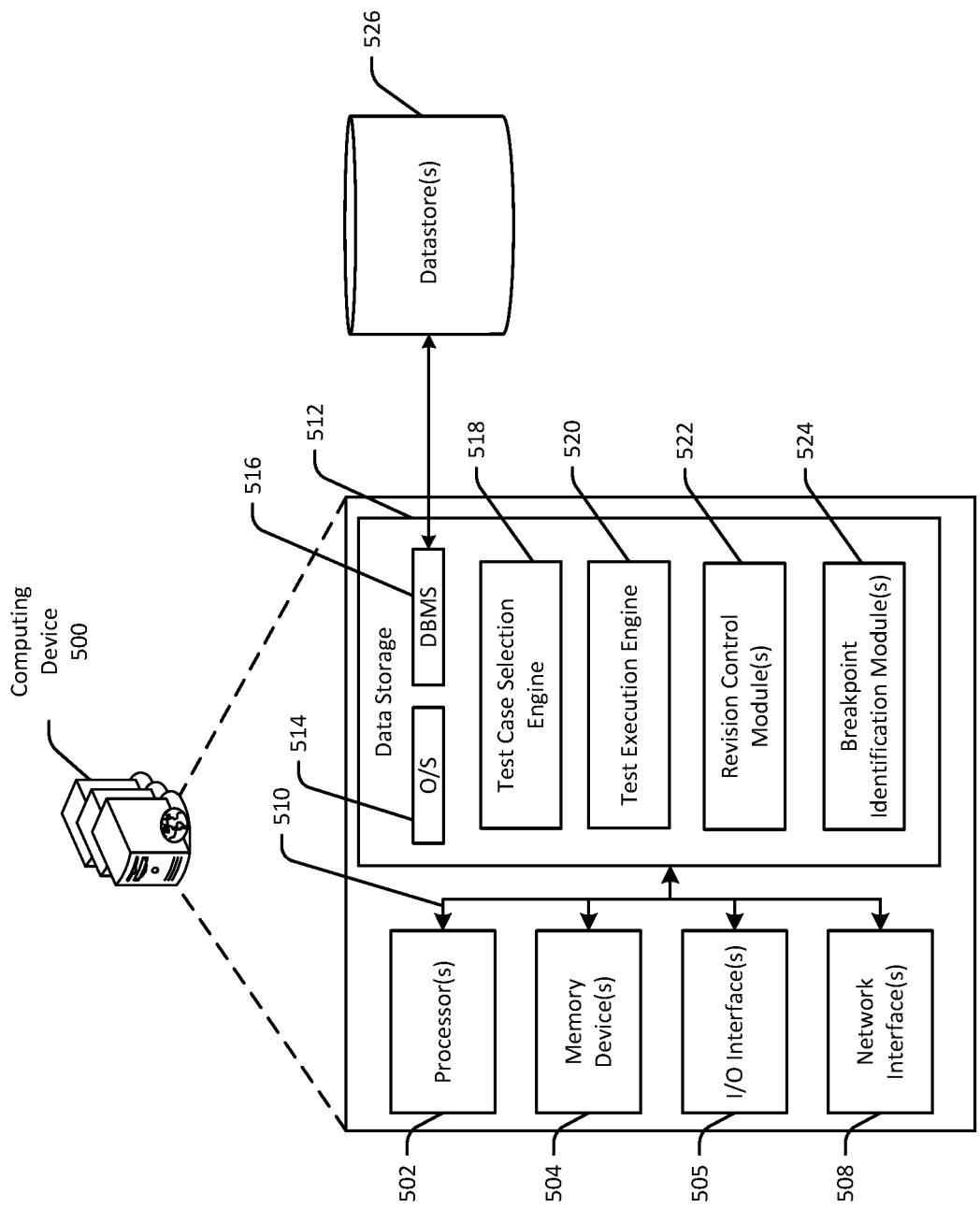
FIG. 5 is a schematic diagram of an illustrative computing device configured to implement one or more example embodiments of the invention.

FIG. 5 is a schematic diagram of an illustrative computing device 500 configured to implement one or more example embodiments of the invention. The illustrative computing device 500 may include a server or collection of servers; a personal computer; a handheld device; or the like. While the computing device 500 and/or any particular component of the computing device 500 may be described herein in the singular, it should be appreciated that multiple instances of the computing device 500 and/or any component thereof may be provided and functionality described in connection with the computing device 500 may be distributed across multiple computing devices 500 and/or across multiple instances of any particular component of the computing device 500.

In an illustrative configuration, the computing device 500 may include one or more processors (processor(s)) 502, one or more memory devices 504 (generically referred to herein as memory 504), one or more input/output ("I/O") interfaces 505, one or more network interfaces 508, and data storage 512. The computing device 500 may further include one or more buses 510 that functionally couple various components of the computing device 500.

The bus(es) 510 may include at least one of a system bus, a memory bus, an address bus, or a message bus, and may permit the exchange of information (e.g., data (including computer-executable code), signaling, etc.) between various components of the computing device 500. The bus(es) 510 may include, without limitation, a memory bus or a memory controller, a peripheral bus, an accelerated graphics port, and so forth. The bus(es) 510 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 512 may include removable storage and/or non-removable storage including, but not limited to, magnetic storage, optical disk storage, and/or tape storage. The data storage 512 may provide non-volatile storage of computer-executable instructions and other data. The memory 504 and the data storage 512, removable and/or non-removable, are examples of computer-readable storage media (CRSM) as that term is used herein.

The data storage 512 may store computer-executable code, instructions, or the like that may be loadable into the memory 504 and executable by the processor(s) 502 to cause the processor(s) 502 to perform or initiate various operations. The data storage 512 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504 and may ultimately be copied to data storage 512 for non-volatile storage.

More specifically, the data storage 512 may store one or more operating systems (O/S) 514; one or more database management systems (DBMS) 516 configured to access the memory 504 and/or one or more external datastores 526; and one or more program modules, applications, engines, managers, computer-executable code, scripts, or the like such as, for example, a test case selection engine 518; a test execution engine 520; one or more revision control modules 522; and one or more breakpoint identification modules 524. Any of the components depicted as being stored in data storage 512 may include any combination of software, firmware, and/or hardware. The software and/or firmware may include computer-executable instructions (e.g., computer-executable program code) that may be loaded into the memory 504 for execution by one or more of the processor(s) 502 to perform any of the operations described earlier in connection with correspondingly named modules/engines depicted in FIG. 1.

Although not depicted in FIG. 5, the data storage 512 may further store various types of data utilized by components of the computing device 500 (e.g., data stored in the datastore(s) 526). Any data stored in the data storage 512 may be loaded into the memory 504 for use by the processor(s) 502 in executing computer-executable instructions. In addition, any data stored in the data storage 512 may potentially be stored in the external datastore(s) 526 and may be accessed via the DBMS 516 and loaded in the memory 504 for use by the processor(s) 502 in executing computer-executable instructions.

The processor(s) 502 may be configured to access the memory 504 and execute computer-executable instructions loaded therein. For example, the processor(s) 502 may be configured to execute computer-executable instructions of the various program modules, applications, engines, managers, or the like of the computing device 500 to cause or facilitate various operations to be performed in accordance with one or more embodiments of the invention. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to other illustrative components depicted as being stored in the data storage 512, the O/S 514 may be loaded from the data storage 512 into the memory 504 and may provide an interface between other application software executing on the computing device 500 and hardware resources of the computing device 500. More specifically, the O/S 514 may include a set of computer-executable instructions for managing hardware resources of the computing device 500 and for providing common services to other application programs. In certain example embodiments, the O/S 514 may include or otherwise control the execution of one or more of the program modules, engines, managers, or the like depicted as being stored in the data storage 512. The O/S 514 may include any operating system now known or which may be developed in the future including, but not limited to, any server operating system, any mainframe operating system, or any other proprietary or non-proprietary operating system.

The DBMS 516 may be loaded into the memory 504 and may support functionality for accessing, retrieving, storing, and/or manipulating data stored in the memory 504, data stored in the data storage 512, and/or data stored in external datastore(s) 526. The DBMS 516 may use any of a variety of database models (e.g., relational model, object model, etc.) and may support any of a variety of query languages.

The DBMS 516 may access data represented in one or more data schemas and stored in any suitable data repository. Data stored in the datastore(s) 526 may include, for example, breakpoint values; fingerprints; source code; code changes; regression tests; attribute seeds; translation table entries; and so forth, any portion of which may alternatively or additionally be stored in the data storage 512. External datastore(s) 526 that may be accessible by the computing device 500 via the DBMS 516 may include, but are not limited to, databases (e.g., relational, object-oriented, etc.), file systems, flat files, distributed datastores in which data is stored on more than one node of a computer network, peer-to-peer network datastores, or the like. In example embodiments, the datastore(s) 526 may include the datastore(s) 105 depicted in FIG. 1.

Referring now to other illustrative components of the computing device 500, the input/output (I/O) interface(s) 505 may facilitate the receipt of input information by the computing device 500 from one or more I/O devices as well as the output of information from the computing device 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 500 or may be separate. The I/O devices may further include, for example, any number of peripheral devices such as data storage devices, printing devices, and so forth.

The I/O interface(s) 505 may also include an interface for an external peripheral device connection such as universal serial bus (USB), FireWire, Thunderbolt, Ethernet port or other connection protocol that may connect to one or more networks. The I/O interface(s) 505 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 500 may further include one or more network interfaces 508 via which the computing device 500 may communicate with any of a variety of other systems, platforms, networks, devices, and so forth. The network interface(s) 508 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 5 as being stored in the data storage 512 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 500 and/or other computing devices may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 500 may include alternate and/or additional hardware, software, or firmware components beyond those described or depicted without departing from the scope of the invention. More particularly, it should be appreciated that software, firmware, or hardware components depicted as forming part of the computing device 500 are merely illustrative and that some components may not be present or additional components may be provided in various embodiments. While various illustrative modules have been depicted and described as software modules stored in data storage 512, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 300 and/or the method 400 may be performed by one or more computing devices 500 having the illustrative configuration depicted in FIG. 5, or more specifically, by one or more program modules, engines, applications, or the like executable on such a device. It should be appreciated, however, that such operations may be implemented in connection with numerous other device configurations.

The operations described and depicted in the illustrative methods of FIGS. 3 and 4 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIGS. 3 and 4 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performing revision control for source code, the method comprising:
   identifying one or more portions of the source code that have been modified;
   determining a collection of breakpoints corresponding to the one or more modified portions of the source code;
   determining a group of regression test cases that cumulatively provide coverage of the collection of breakpoints, wherein determining the group of regression test cases comprises:
   determining stored fingerprints that are cumulatively indicative of the collection of breakpoints;
   determining attribute seeds that respectively correspond to the stored fingerprints: and
   determining the group of regression test cases based at least in part on their respective correspondence to the attribute seeds fingerprints of that test case;
   executing the group of regression test cases;
   determining that the group of regression test cases successfully executed; and
   committing the one or more modified portions of the source code.

2. The computer-implemented method of claim 1, wherein determining the collection of breakpoints corresponding to the one or more modified portions of the source code comprises:
   determining lines of the source code that are included in the one or more modified portions of the source code; and
   determining the collection of breakpoints corresponding to the lines of the source code.

3. The computer-implemented method of claim 1, wherein determining the stored fingerprints that are cumulatively indicative of the collection of breakpoints comprises determining that each stored fingerprint is indicative of at least one encounter with at least one breakpoint in the collection of breakpoints during execution of a corresponding regression test case.

4. The computer-implemented method of claim 1, wherein determining the stored fingerprints that are cumulatively indicative of the collection of breakpoints comprises determining that each stored fingerprint is indicative of an encounter with at least one breakpoint in the collection of breakpoints that no other stored fingerprint is indicative of.

5. The computer-implemented method of claim 1, wherein the group of regression test cases comprises a first regression test case and a second regression test case, the method further comprising:
   determining a first stored fingerprint corresponding to the first regression test case;
   determining a second stored fingerprint corresponding to the second regression test case;
   determining a first number of breakpoints encountered during execution of the first regression test case based at least in part on the first stored fingerprint;
   determining a second number of breakpoints encountered during execution of the second regression test case based at least in part on the second stored fingerprint;
   determining that the first number of breakpoints is greater than the second number of breakpoints; and
   prioritizing execution of the first regression test case over execution of the second regression test case.

6. The computer-implemented method of claim 1, wherein each attribute seed comprises a combination of attribute values tested by a respective corresponding regression test case.

7. A system for performing revision control for source code, the system comprising:
   at least one processor; and
   at least one memory storing computer-executable instructions, wherein the at least one processor is configured to access the at least one memory and execute the computer-executable instructions to:
   identify one or more portions of the source code that have been modified;
   determine a collection of breakpoints corresponding to the one or more modified portions of the source code;
   determine a group of regression test cases that cumulatively provide coverage of the collection of breakpoints, wherein determining the group of regression test cases comprises:
   determining stored fingerprints that are cumulatively indicative of the collection of breakpoints;
   determining attribute seeds that respectively correspond to the stored fingerprints: and
   determining the group of regression test cases based at least in part on their respective correspondence to the attribute seeds fingerprints of that test case;
   execute the group of regression test cases;
   determine that the group of regression test cases successfully executed; and
   commit the one or more modified portions of the source code.

8. The system of claim 7, wherein the at least one processor is configured to determine the collection of breakpoints corresponding to the one or more modified portions of the source code by executing the computer-executable instructions to:
   determine lines of the source code that are included in the one or more modified portions of the source code; and
   determine the collection of breakpoints corresponding to the lines of the source code.

9. The system of claim 7, wherein the at least one processor is configured to determine the stored fingerprints that are cumulatively indicative of the collection of breakpoints by executing the computer-executable instructions to determine that each stored fingerprint is indicative of at least one encounter with at least one breakpoint in the collection of breakpoints during execution of a corresponding regression test case.

10. The system of claim 7, wherein the at least one processor is configured to determine the stored fingerprints that are cumulatively indicative of the collection of breakpoints by executing the computer-executable instructions to determine that each stored fingerprint is indicative of an encounter with at least one breakpoint in the collection of breakpoints that no other stored fingerprint is indicative of.

11. The system of claim 7, wherein the group of regression test cases comprises a first regression test case and a second regression test case, and wherein the at least one processor is further configured to execute the computer-executable instructions to:
- determine a first stored fingerprint corresponding to the first regression test case;
- determine a second stored fingerprint corresponding to the second regression test case;
- determine a first number of breakpoints encountered during execution of the first regression test case based at least in part on the first stored fingerprint;
- determine a second number of breakpoints encountered during execution of the second regression test case based at least in part on the second stored fingerprint;
- determining that the first number of breakpoints is greater than the second number of breakpoints; and
- prioritize execution of the first regression test case over execution of the second regression test case.

12. The system of claim 7, wherein each attribute seed comprises a combination of attribute values tested by a respective corresponding regression test case.

13. A computer program product for performing revision control for source code, the computer program product comprising a computer readable storage medium having program instructions embodied therewith, the program instructions readable by a processing circuit to cause the processing circuit to perform a method comprising:
- identifying one or more portions of the source code that have been modified;
- determining a collection of breakpoints corresponding to the one or more modified portions of the source code;
- determining a group of regression test cases that cumulatively provide coverage of the collection of breakpoints, wherein determining the group of regression test cases comprises:
  - determining stored fingerprints that are cumulatively indicative of the collection of breakpoints;
  - determining attribute seeds that respectively correspond to the stored fingerprints; and
  - determining the group of regression test cases based at least in part on their respective correspondence to the attribute seeds fingerprints of that test case;
- executing the group of regression test cases;
- determining that the group of regression test cases successfully executed; and
- committing the one or more modified portions of the source code.

14. The computer program product of claim 13, wherein determining the collection of breakpoints corresponding to the one or more modified portions of the source code comprises:
- determining lines of the source code that are included in the one or more modified portions of the source code; and
- determining the collection of breakpoints corresponding to the lines of the source code.

15. The computer program product of claim 13, wherein determining the stored fingerprints that are cumulatively indicative of the collection of breakpoints comprises determining that each stored fingerprint is indicative of at least one encounter with at least one breakpoint in the collection of breakpoints during execution of a corresponding regression test case.

16. The computer program product of claim 13, wherein determining the stored fingerprints that are cumulatively indicative of the collection of breakpoints comprises determining that each stored fingerprint is indicative of an encounter with at least one breakpoint in the collection of breakpoints that no other stored fingerprint is indicative of.

17. The computer program product of claim 13, wherein the group of regression test cases comprises a first regression test case and a second regression test case, the method further comprising:
- determining a first stored fingerprint corresponding to the first regression test case;
- determining a second stored fingerprint corresponding to the second regression test case;
- determining a first number of breakpoints encountered during execution of the first regression test case based at least in part on the first stored fingerprint;
- determining a second number of breakpoints encountered during execution of the second regression test case based at least in part on the second stored fingerprint;
- determining that the first number of breakpoints is greater than the second number of breakpoints; and
- prioritizing execution of the first regression test case over execution of the second regression test case.

* * * * *